United States Patent
Tanaka

(10) Patent No.: US 7,784,294 B2
(45) Date of Patent: *Aug. 31, 2010

(54) REFRIGERATOR UNIT FOR CONTAINER

(75) Inventor: Takashi Tanaka, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/274,826

(22) Filed: Nov. 20, 2008

(65) Prior Publication Data

US 2009/0077986 A1    Mar. 26, 2009

Related U.S. Application Data

(62) Division of application No. 10/530,181, filed as application No. PCT/JP2004/006021 on Apr. 26, 2004, now Pat. No. 7,467,522.

(30) Foreign Application Priority Data

Apr. 28, 2004   (JP)   ............... 2003-123493

(51) Int. Cl.
*F25D 17/04*    (2006.01)
*F24F 7/00*     (2006.01)
(52) U.S. Cl. ............ 62/186; 236/49.3; 454/258
(58) Field of Classification Search ............ 62/186; 236/49.3, 51; 454/358, 361
See application file for complete search history.

(56) References Cited

U.S. PATENT DOCUMENTS

| 5,965,185 A | 10/1999 | Bianco |
| 6,077,160 A | 6/2000 | Franaszek et al. |
| 6,079,627 A | 6/2000 | Kettler |

FOREIGN PATENT DOCUMENTS

| EP | 0457431 A2 | 11/1991 |
| JP | 58-102191 U | 7/1983 |
| JP | 63-123935 A | 5/1988 |
| JP | 06-011235 A | 1/1994 |
| JP | 09-280720 A | 10/1997 |
| JP | 10026382 A * | 1/1998 |
| JP | 2001-248867 A | 9/2001 |
| JP | 2001-294097 A | 10/2001 |
| JP | 2003-169489 A | 6/2003 |
| JP | 2005-284510 A | 10/2005 |

* cited by examiner

*Primary Examiner*—Marc E Norman
(74) *Attorney, Agent, or Firm*—Global IP Counselors

(57) ABSTRACT

A refrigerator unit is configured for a container in which it is possible to know the quantity of air that is ventilated. The refrigerator unit is equipped with a ventilation mechanism, an opening degree detecting mechanism, and a recording unit. The ventilation mechanism ventilates the air inside the container. The opening degree detecting mechanism acquires ventilation data related to the quantity of air ventilated by the ventilation mechanism. The recording unit records the ventilation data acquired by the opening degree detecting mechanism.

4 Claims, 15 Drawing Sheets

Fig. 10

| TRIP REPORT | | | | | | |
|---|---|---|---|---|---|---|
| | | | | | | D1 |
| '02/05/17 16:59 | | | | | | FA 35m³/h |
| '02/05/17 17:00 | 13.0C | 15.6C | 15.9C | 15.4C | *** | Thermo off |
| '02/05/17 18:00 | 13.0C | 13.2C | 15.4C | 12.9C | *** | Modulation |
| '02/05/17 19:00 | 13.0C | 13.0C | 15.4C | 14.0C | *** | Modulation |
| '02/05/17 20:00 | 13.0C | 13.0C | 15.2C | 15.0C | *** | Modulation |
| '02/05/17 21:00 | 13.0C | 13.0C | 15.0C | 14.0C | *** | Modulation |
| '02/05/17 22:00 | 13.0C | 13.0C | 14.7C | 15.0C | *** | Modulation |
| '02/05/17 23:00 | 13.0C | 13.0C | 14.6C | 15.0C | *** | Modulation |
| '02/05/17 00:00 | 13.0C | 13.0C | 14.6C | 17.0C | *** | Modulation |
| '02/05/18 00:00 | | | | 16.0C | *** | |
| | | | | | | D2 |
| '02/05/18 01:00 | 13.0C | 13.0C | 14.5C | 12.9C | 18.0C | *** | FA 35m³/h |
| '02/05/18 01:58 | | | | | *** | Modulation |
| '02/05/18 01:58 | | | | | | Power OFF |
| '02/05/18 01:58 | | | | | | Power On |
| '02/05/18 01:58 | | | | | | Unit ON |
| | | | | | | D3 |
| '02/05/18 02:00 | 13.0C | 11.7C | 14.4C | 12.4C | 18.0C | *** | FA 35m³/h |
| '02/05/18 03:00 | 13.0C | 13.0C | 14.1C | 12.9C | 21.0C | *** | Modulation |
| '02/05/18 04:00 | 13.0C | 13.0C | 14.0C | 12.9C | 23.0C | *** | Modulation |
| '02/05/18 05:00 | 13.0C | 12.9C | 14.0C | 12.9C | 24.0C | *** | Modulation |
| '02/05/18 06:00 | 13.0C | 13.0C | 14.1C | 12.8C | | *** | Modulation |

T2, T1

REFRIGERATOR UNIT FOR CONTAINER

CROSS-REFERENCE TO RELATED APPLICATIONS

This application is a divisional application of U.S. patent application Ser. No. 10/530,181 filed on Apr. 4, 2005, pending, allowed. The entire disclosure of U.S. patent application Ser. No. 10/530,181 is hereby incorporated herein by reference. U.S. patent application Ser. No. 10/530,181 is the U.S. National Stage application of PCT/JP2004/006021, and claims priority to Japanese Patent Application No. 2003-123493, filed on Apr. 28, 2003.

BACKGROUND OF THE INVENTION

1. Field of the Invention

The present invention is related to a refrigerator unit for a container.

2. Background Information

For some time, refrigerator units for container have been used to cool the inside of containers used for freight transport and the like. Some of these refrigerator units for container are equipped with ventilation units for ventilating the interior of the container. For example, in the case of a container used for transporting fruits and vegetables, it is necessary to provide an appropriate degree of ventilation of the air inside the container in order to keep the fruits and vegetables fresh. A ventilation unit is therefore used to accomplish the ventilation of the interior of the container (see Japanese Laid-Open Patent Publication No. 9-280720).

Meanwhile, there is a need to know the quantity of air that is exchanged by the ventilation units used in container refrigeration units. In the example presented above, since the ventilation affects the freshness of the fruits and vegetables, knowing the quantity of air that has been ventilated is useful for maintaining the freshness of the fruits and vegetables. Also, if the quantity of ventilation is known, a transport company transporting fruits and vegetables can provide a fruit and vegetable owner with a guarantee that an appropriate degree of ventilation is being conducted.

However, it is difficult to know the quantity of air that is ventilated to and from conventional container refrigeration units like that just described.

SUMMARY OF THE INVENTION

The object of the present invention is to provide a refrigerator unit for container for which it is possible to know the quantity of air that is ventilated.

A refrigerator unit for container in accordance with the first aspect of the invention is equipped with a ventilation unit, an acquisition unit, and a recording unit. The ventilation unit ventilates the air inside the container. The acquisition unit acquires ventilation data related to the quantity of air ventilated by the ventilation unit. The recording unit records the ventilation data acquired by the acquisition unit. The ventilation data is not limited to data that indicates the quantity of ventilated air directly; it is also acceptable for the ventilation data to be data that indicates the quantity of ventilated air indirectly.

With this refrigerator unit for container, the interior of the container is ventilated and ventilation data related to the quantity of ventilated air is recorded. Consequently, it is possible to review the recorded ventilation data. Thus, with this refrigerator unit for container, it is possible to know the quantity of ventilated air.

A refrigerator unit for container in accordance with the second aspect of the invention is a refrigerator unit for container according to the first aspect, further equipped with a first output unit. The first output unit is configured to output the quantity of air ventilated by the ventilation unit based on the ventilation data recorded by the recording unit.

With this refrigerator unit for container, the quantity of air ventilated by the ventilation unit is outputted by the first output unit. Thus, with this refrigerator unit for container, it is possible to easily know the quantity of ventilated air.

A refrigerator unit for container in accordance with the third aspect of the invention is a refrigerator unit for container according to the first aspect, further equipped with a second output unit. The second output unit is configured to output the ventilation data recorded by the recording unit.

With this refrigerator unit for container, the ventilation data is outputted by the second output unit. Consequently, if the ventilation data is data that directly indicates the quantity of ventilated air, the quantity of ventilated air can be known directly. Meanwhile, if the ventilation data is data that indirectly indicates the quantity of ventilated air, the quantity of ventilated air can be known indirectly. Thus, with this refrigerator unit for container, it is possible to easily know the quantity of ventilated air.

A refrigerator unit for container in accordance with the fourth aspect of the invention is a refrigerator unit for container according to any one of the first to third aspects, wherein the ventilation unit has a ventilation passage and an opening/closing member. The ventilation passage serves as a passage through which the ventilated air passes. The opening/closing member opens and closes the ventilation passage. The ventilation data includes opening degree data indicating the degree to which the opening/closing member has opened the ventilation passage.

With this refrigerator unit for container, the interior of the container is ventilated by opening and closing the ventilation passage with the opening/closing member. Consequently, the quantity of ventilated air is affected by the degree to which the opening/closing member opens the ventilation passage. Thus, with this refrigerator unit for container, it is possible to know the quantity of ventilated air based on the opening degree data.

A refrigerator unit for container in accordance with the fifth aspect of the invention is a refrigerator unit for container according to the fourth aspect, wherein the opening/closing member is configured to open and close the ventilation passage by being moved in a manual fashion.

With this refrigerator unit for container, the opening/closing member is configured to open and close the ventilation passage by being moved in a manual fashion. Conventionally, it is difficult to know the quantity of ventilated air when the opening degree of the ventilation passage is changed manually. For example, if the opening/closing member is manually moved more than once during a transport, at the end of the transport it is difficult to know the history of how the opening degree of the ventilation passage has changed. However, with this refrigerator unit for container, the opening degree data is recorded by the recording unit. Thus, with this refrigerator unit for container, it is possible to know the quantity of ventilated air.

A refrigerator unit for container in accordance with the sixth aspect of the invention is a refrigerator unit for container according to the fourth or fifth aspects, wherein the acquisition unit has an opening degree detecting means. The opening degree detecting means detects the opening degree based on the amount of movement of the opening/closing member.

With this refrigerator unit for container, the opening degree detecting means detects the opening degree based on the amount of movement of the opening/closing member. As a result, the opening degree data can be acquired easily based on the movement amount of the opening/closing member.

A refrigerator unit for container in accordance with the seventh aspect of the invention is a refrigerator unit for container according to the sixth aspect, wherein the acquisition unit has a transmitting means configured to transmit the movement amount of the opening/closing member to the opening degree detecting means.

With this refrigerator unit for container, the transmitting means transmits the movement amount of the opening/closing member to the opening degree detecting means. As a result, the movement amount of the opening/closing member can be transmitted to the opening degree detecting means even if the opening/closing member and the opening degree detecting means are in separated positions.

A refrigerator unit for container in accordance with the eighth aspect of the invention is a refrigerator unit for container according to the seventh aspect, further equipped with a thermally insulated wall. The thermally insulated wall is made of a thermal insulation material and is arranged and configured to separate the interior and exterior of the container. The transmitting means is a member imbedded in the thermally insulated wall.

Refrigerator units for container are generally provided with a thermally insulated wall in order to maintain the temperature of the container interior. If the transmitting means is installed on the outside of the thermally insulated wall in a position facing the exterior of the container, it will affect the exterior appearance of the container. Conversely, if the transmitting means is installed on the inside of the thermally insulated wall in a position facing the interior of the container, it is possible that the ability of the transmitting means to transmit will be disturbed when the temperature of the container interior is extremely low.

However, with this refrigerator unit for container, the transmitting means is embedded in the thermally insulated wall. As a result, the transmitting means is prevented from affecting the external appearance of the container. Also, the transmitting means can transmit in a trouble-free manner without being affected by the temperature of the container interior.

A refrigerator unit for container in accordance with the ninth aspect of the invention is a refrigerator unit for container according to the seventh or eighth aspects, further provided with a temperature detecting means and a correction unit. The temperature detecting means detects the ambient temperature surrounding the transmitting means. The correction unit corrects the opening/closing member movement amount transmitted by the transmitting means based on the ambient temperature.

With this refrigerator unit for container, the opening/closing member movement amount transmitted by the transmitting means is corrected based on the ambient temperature. As a result, even if the transmitting means elongates or shortens due to the temperature, the movement amount of the opening/closing means can be detected accurately.

A refrigerator unit for container in accordance with the tenth aspect of the invention is a refrigerator unit for container according to any one of the fourth to ninth aspects, wherein the recording unit is configured to record ventilation data when the opening degree of the opening/closing member is changed.

With this refrigerator unit for container, ventilation data is recorded when the opening degree of the opening/closing member is changed. As a result, it is possible to know with good precision how the quantity of ventilated air has changed due to changes in the opening degree of the opening/closing member.

A refrigerator unit for container in accordance with the eleventh aspect of the invention is a refrigerator unit for container according to any one of the first to tenth aspects, wherein the recording unit is configured to record ventilation data when the refrigerator unit for container starts running.

With this refrigerator unit for container, ventilation data is recorded when the refrigerator unit for container starts running. As a result, ventilation data can be obtained from the time when the refrigerator unit for container starts running.

A refrigerator unit for container in accordance with the twelfth aspect of the invention is a refrigerator unit for container according to any one of the first to eleventh aspects, wherein the recording unit is configured to record ventilation data each time a specific amount of time elapses or at a specific time of day.

With this refrigerator unit for container, the ventilation data is recorded each time a specific amount of time elapses or at a specific time of day. As a result, it is possible to know how the quantity of ventilated air changes with respect to a specific repeated time interval or a specific time of day.

A refrigerator unit for container in accordance with the thirteenth aspect of the invention is a refrigerator unit for container according to any one of the first to third aspects, wherein the ventilation unit has a ventilation passage and an air speed detecting means. The ventilation passage serves as a passage through which the ventilated air passes. The air speed detecting means detects the speed of the air passing through the ventilation passage. The ventilation data includes the air speed data detected by the air speed detecting means.

With this refrigerator unit for container, the air speed data detected by the air speed detecting means is recorded. The speed of the air passing through the ventilation passage indicates the quantity of ventilated air indirectly. Thus, with this refrigerator unit for container, it is possible to know the quantity of ventilated air because the air speed data is recorded.

A refrigerator unit for container in accordance with the fourteenth aspect of the invention is a refrigerator unit for container according to any one of the first to third aspects, wherein the ventilation unit has a ventilation passage and a blower device. The ventilation passage serves as a passage through which the ventilated air passes. The blower device generates a flow of air that is ventilated through the ventilation passage. The ventilation data includes output data from the blower device.

With this refrigerator unit for container, the output data of the blower device is recorded. The output of the blower device indicates the quantity of ventilated air indirectly. For example, the larger the output of the blower device, the larger the quantity of ventilated air; the smaller the output of the blower device, the smaller the quantity of ventilated air. Thus, with this refrigerator unit for container, it is possible to know the quantity of ventilated air because the output data is recorded.

A refrigerator unit for container in accordance with the fifteenth aspect of the invention is a refrigerator unit for container according to any one of the first to third aspects, wherein the ventilation unit has a ventilation passage and a pressure detecting means. The ventilation passage serves as a passage through which the ventilated air passes. The pressure detecting means detects the pressure difference between the inlet and outlet of the ventilation passage. The ventilation data includes the pressure difference data detected by the pressure detecting means.

With this refrigerator unit for container, the pressure difference data detected by the pressure detecting means is recorded. The pressure difference between the inlet and outlet of the ventilation passage indicates the quantity of ventilated air indirectly. For example, the larger the pressure difference between the inlet and outlet of the ventilation passage, the larger the quantity of ventilated air; the smaller the pressure difference between the inlet and outlet of the ventilation passage, the smaller the quantity of ventilated air. Thus, with this refrigerator unit for container, it is possible to know the quantity of ventilated air because the pressure difference data is recorded.

A refrigerator unit for container in accordance with the sixteenth aspect of the invention is a refrigerator unit for container according to any one of the first to third aspects, wherein the ventilation data includes freight quantity data related to the quantity of freight loaded in the container.

With this refrigerator unit for container, freight quantity data related to the quantity of freight loaded in the container is recorded. The quantity of freight loaded in the container affects the pressure difference between the interior and exterior of the container. The pressure difference between the interior and exterior of the container affects the quantity of air that is ventilated. Thus, with this refrigerator unit for container, it is possible to know the quantity of ventilated air because the freight quantity data is recorded.

A refrigerator unit for container in accordance with the seventeenth aspect of the invention is a refrigerator unit for container according to any one of the first to sixteenth aspects, wherein the ventilation data is data that indirectly indicates the quantity of air ventilated by the ventilation unit. Also, this refrigerator unit for container is further provided with a conversion unit configured to convert the ventilation data into a quantity of air.

With this refrigerator unit for container, the ventilation data is converted into a quantity of air by the conversion unit. Thus, even if the ventilation data is data that indirectly indicates the quantity of ventilated air, the quantity of ventilated air can be known directly by converting the ventilation data into the quantity of ventilated air.

A refrigerator unit for container in accordance with the eighteenth aspect of the invention is a refrigerator unit for container according to the seventeenth aspect, wherein the conversion unit has a plurality of different converting means adapted to different ventilation unit configurations.

The relationship between the ventilation data and the quantity of air often differs depending on the constituent features of the ventilation unit. Consequently, it is difficult to convert the ventilation data accurately when the same conversion formula is used irregardless of the constituent features of the ventilation unit.

With this refrigerator unit for container, however, the ventilation data is converted into a quantity of air using a plurality of different converting means adapted to different ventilation unit configurations. Thus, with this refrigerator unit for container, the ventilation data can be converted more accurately into the quantity of ventilated air.

BRIEF DESCRIPTION OF THE DRAWINGS

FIG. 10 illustrates an example of the output indicating the ventilation quantity and other information.

DETAILED DESCRIPTION OF THE PREFERRED EMBODIMENTS

Constituent Features of Refrigerator Unit for Container

Figure 1:
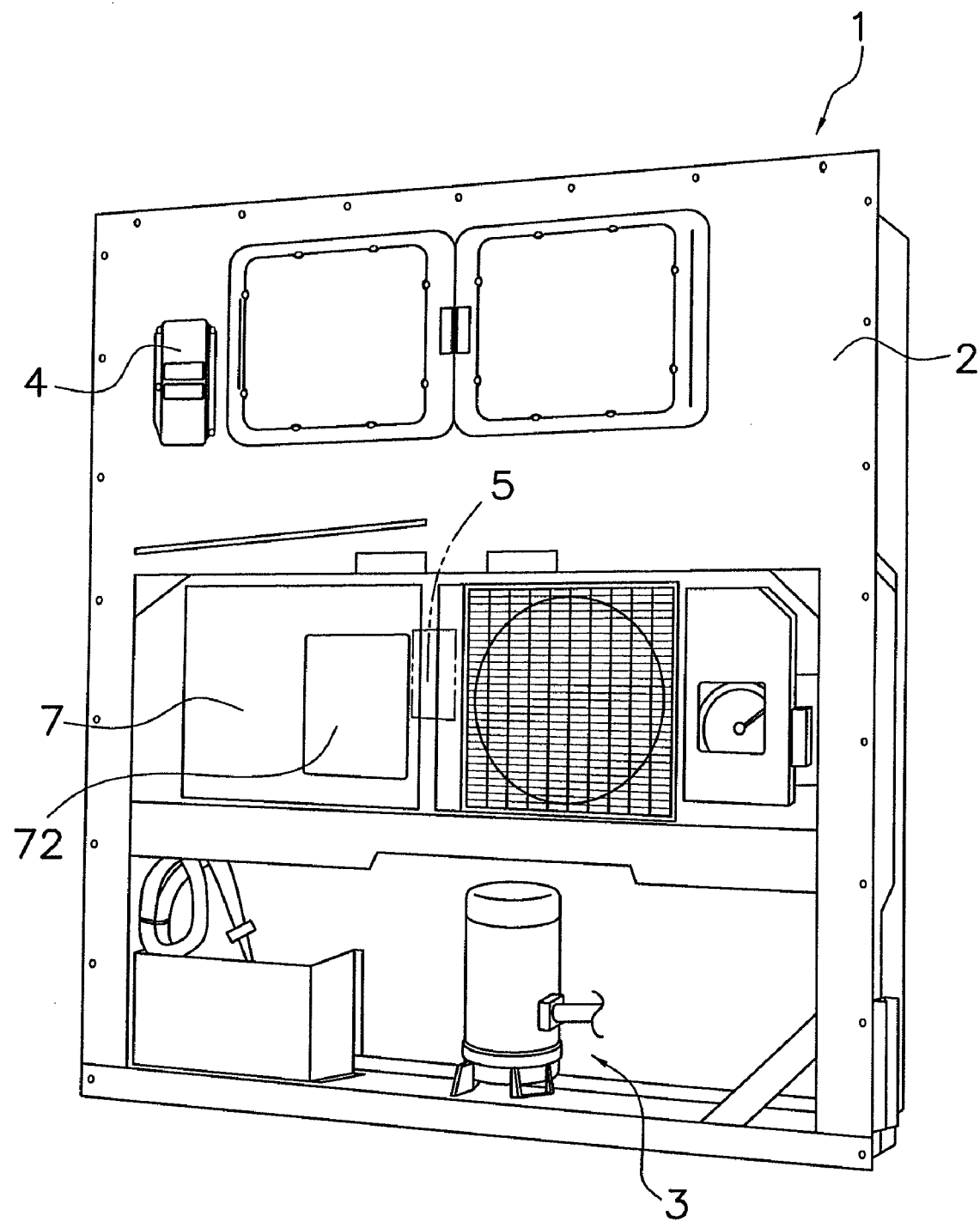
FIG. 1 is a perspective view showing the external appearance of the refrigerator unit for container 1.
Figure 2:
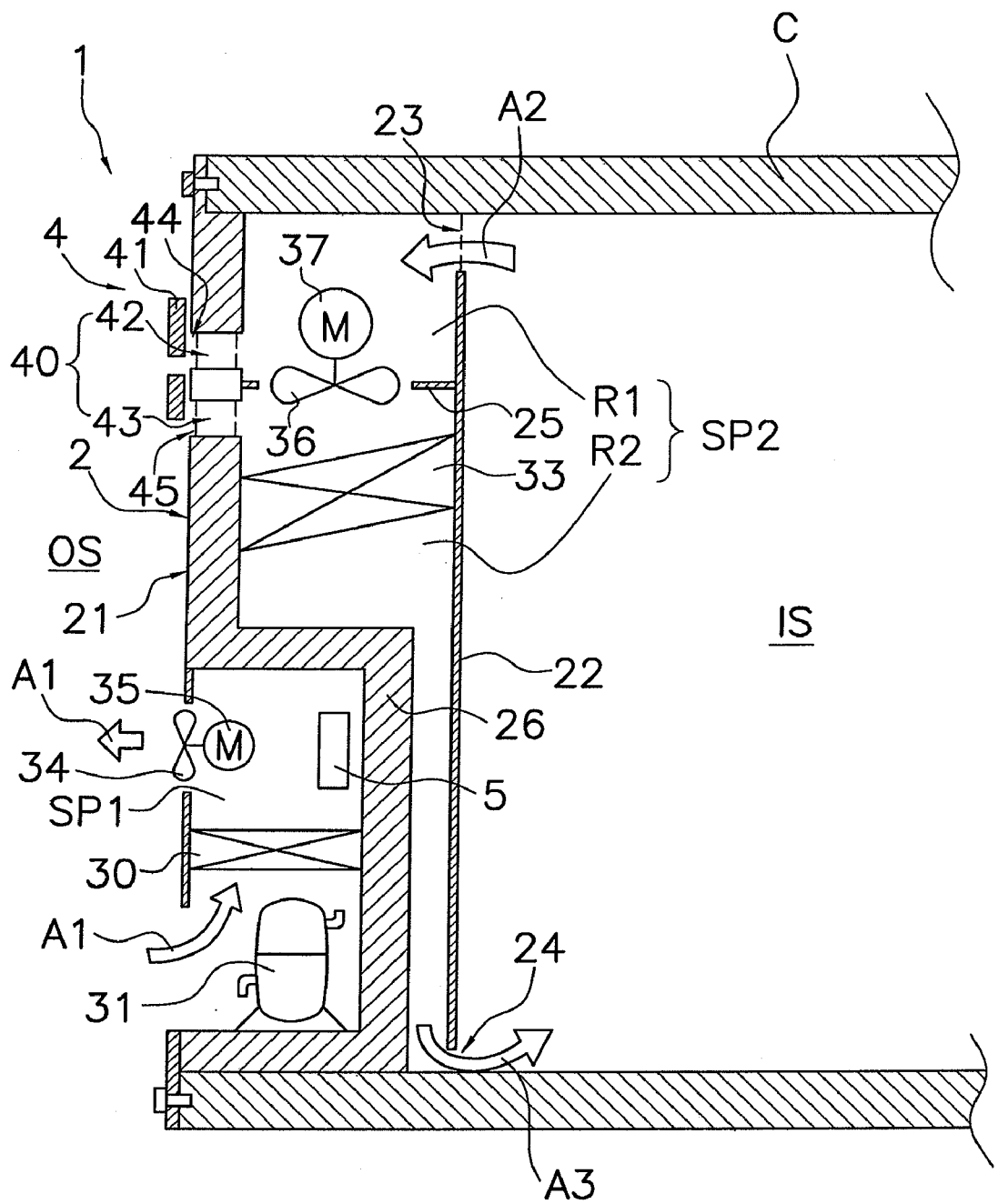
FIG. 2 is a side cross sectional view showing of the refrigerator unit for container 1.

A refrigerator unit for container 1 that employs an embodiment of the present invention is shown in FIGS. 1 and 2. FIG. 1 is a perspective view of the external appearance of the refrigerator unit for container 1 and FIG. 2 is a side cross sectional view of the refrigerator unit for container 1 when it is mounted to a container C. The refrigerator unit for container 1 is a device for maintaining a prescribed temperature in the interior IS of the freight container C and is mounted to an opening of the container C in such a manner as to separate the interior IS of the container C from the exterior OS of the same. The refrigerator unit for container 1 is provided with a frame 2, refrigerant circuit component parts 3, a ventilation mechanism 4 (ventilation unit), an opening degree sensing mechanism 5 (acquisition unit), various sensors 6 (see FIG. 7), and a control unit 7.

Frame

The frame 2 has a generally sheet-like shape and is mounted in such a fashion as to block one side of the container C. As shown in FIG. 2, the frame 2 is provided with an exterior storage space SP1 and an interior storage space SP2.

The exterior storage space SP1 has a recessed shape and is formed in a lower portion of a front face 21 on the side of the frame 2 that faces the exterior OS of the container C. The exterior storage space SP1 is isolated from the interior IS of the container C and communicates with the exterior OS of the container C. The upper portion of the front face 21 has a flat shape that is generally parallel to the vertical direction.

The interior storage space SP2 is arranged between the front face 21 and a rear panel 22. The rear panel 22 faces the interior IS of the container C and is separated from the front face 21 by a prescribed distance. The interior storage space SP2 spans from the rear (rear panel side) of the external storage space SP1 to space above the exterior storage space SP1 and communicates with the interior IS of the container C through air vents 23, 24 provided near the top and bottom ends of the rear panel 22. A plate-shaped fan guide 25 is provided in a generally horizontal state in the interior storage space SP2. The an evaporator fan 36 (described later) is mounted to the fan guide 25. The interior storage space SP2 is divided by the fan guide 25 and evaporator fan 36 into a first chamber R1 located above the fan guide 25 and a second chamber R2 located below the fan guide 25.

A thermally insulated wall 26 is provided on the rear side of an upper portion of the front face 21 between the interior storage space SP2 and the exterior OS and on the rear side of a lower portion of the front face 21 between the interior storage space SP2 and the exterior storage space SP1. The thermally insulating wall 26 is made of a thermal insulation material and is arranged and configured to separate the interior IS and exterior OS of the container C. The thermally insulated wall 26 serves to suppress the movement of heat between the interior IS and exterior OS of the container C.

Refrigerant Circuit Component Parts

The refrigerant circuit component parts 3 include such parts as a condenser 30, a compressor 31, an expansion valve 32 (see FIG. 7), and an evaporator 33 and these parts constitute a refrigerant circuit.

The condenser 30, the compressor 31, and the expansion valve 32 are housed in the external storage space SP1. The external storage space SP1 also houses a condenser fan 34 and a condenser fan motor 35. The condenser fan 34 is rotated by the condenser fan motor 35 and serves to produce a flow of air that is drawn into the exterior storage space SP1 from the exterior OS, passes through the condenser 30, and is discharged to the exterior OS (see unshaded arrow A1).

The evaporator 33 is housed in the second chamber R2 of the interior storage space SP2 on the rear side of the upper portion of the front face 21. The internal storage space SP2 also houses an evaporator fan 36 and an evaporator fan motor 37. The evaporator fan 36 and evaporator fan motor 37 are arranged above the evaporator 33. The evaporator fan 36 is provided in the opening of the fan guide 25 and is positioned between the first chamber R1 and the second chamber R2. The first chamber R1 is positioned on the inlet side of the evaporator fan 36 and the second chamber R2 is positioned on the outlet side of the evaporator fan 36. The evaporator fan 36 is rotated by the evaporator fan motor 37 and produces an interior air flow. The interior air flow flows from the interior IS of the container C through the air vent 23 at the upper end of the rear panel 22 and into the first chamber R1 of the interior storage space SP2 (see unshaded arrow A2). The interior air flow then flows from the first chamber R1 through the opening of the fan guide 25 and into the second chamber R2, where it passes through the evaporator 33 arranged in the second chamber R2. Then, the interior air flow flows through the vent 24 at the lower end of the rear panel 22 to the interior IS (see unshaded arrow A3).

Ventilation Mechanism

The ventilation mechanism 4 serves to ventilate the interior IS of the container C and is provided with a ventilation passage 40 and an opening/closing member 41.

Figure 3:
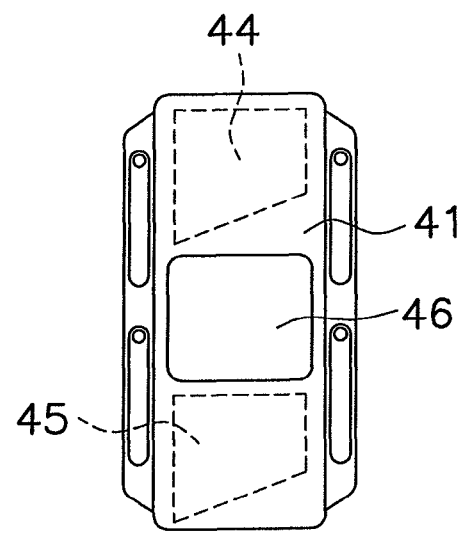
FIG. 3(a) shows the ventilation mechanism 4 in a completely closed state.
FIG. 3(b) shows the ventilation mechanism 4 in an opened state.
FIG. 3(c) shows the ventilation mechanism 4 in a completely opened state.
Figure 3:
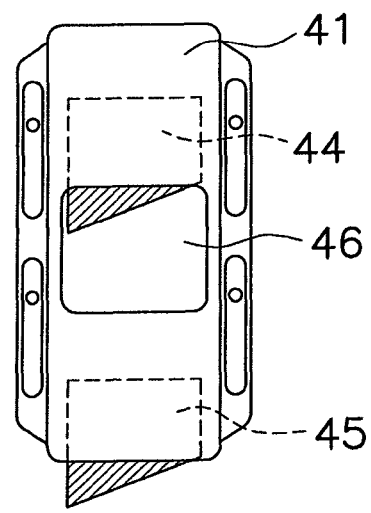
Figure 3:
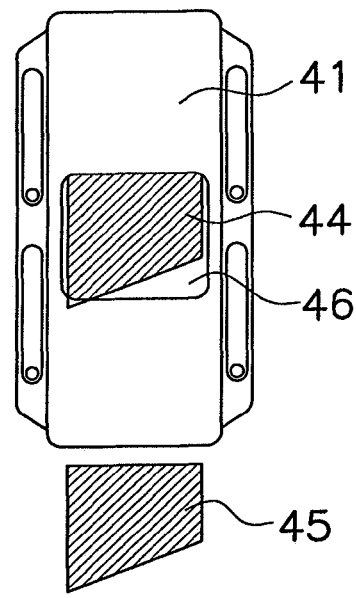

The ventilation passage 40 is a passage through which the ventilated air passes and has an intake passage 42 and an exhaust passage 43. The intake passage 42 and exhaust passage 43 are provided so as to be aligned above and below each other in an upper portion of the front surface 21; the inlet passage 42 is positioned above the exhaust passage 43. The exhaust passage 42 is the passage through which air is drawn into the first chamber R1 from the exterior OS of the container C and is arranged and configured to communicate from an intake port 44 to the first chamber R1 through the thermally insulated wall 26. The exhaust passage 43 is the passage through which air is discharged to the exterior OS of the container C from the second chamber R2 and is arranged and configured to communicate to an exhaust port 45 and the exterior OS through the thermally insulated wall 26. The intake port 44 and the exhaust port 45 are provided in an upper portion of the front face 21 and arranged so as to face the exterior OS with a prescribed vertical spacing there-between. As shown in FIG. 3, the intake port 44 and the exhaust port 45 have the shapes of trapezoids arranged such that the upper and lower bases are parallel to the vertical direction. The upper edges of the intake port 44 and the exhaust port 45 are horizontal and the bottom edges are slanted.

The opening/closing member 41 serves to open and close the ventilation passage 40. The opening/closing member 41 is provided such that it slides freely up and down over the front face 21. The opening/closing member 41 serves to adjust the quantity of ventilated air by adjusting the opening degree of the intake port 44 and the exhaust port 45 in accordance with its slide position. As shown in FIG. 3(a), the opening/closing member 41 has the shape of a rectangle that is long in the vertical direction in a frontal view and is provided with a square opening 46 in the center thereof.

When the ventilation passage 40 is closed, the opening 46 of the opening/closing member 41 is positioned between the intake port 44 and the exhaust port 45 such that the intake port 44 and the exhaust port 45 are closed by the opening/closing member 41. As shown in FIG. 3(b), the opening cross sectional areas of the intake port 44 and exhaust port 45 increase in accordance with the amount of movement of the opening/closing member 41 when the opening/closing member 41 is slid in the vertical direction. When the opening/closing member is moved in this way and the exhaust passage 40 is opened, pressure differences causes the interior IS of the container C to be ventilated. The pressure differences mentioned here are the pressure difference between the interior IS and the interior storage space SP2 and the pressure difference between the exterior OS and the interior storage space SP2. Since the first chamber R1 is positioned on the inlet side of the evaporator fan 36, its pressure is lower than the pressures of both the interior IS and the exterior OS. Consequently, air is drawn from the interior IS to the first chamber R1 through the air vent 23. Likewise, air is drawn from the exterior OS to the first chamber R1 through the intake port 44 and intake passage 42. The air drawn into the first chamber R1 is pulled through the opening of the fan guide 25 by the evaporator fan 36 and delivered to the second chamber R2. Since the second chamber R2 is positioned on the outlet side of the evaporator fan 36, its pressure is higher than the pressures of both the interior IS and the exterior OS. Consequently, a portion of the air delivered to the second chamber R2 is discharged to the exterior OS through the exhaust passage 43 and the exhaust port 45. Meanwhile, the remainder of the air delivered to the second chamber R2 is sent to the interior IS through the evaporator 33 and the air vent 24. In this way, with this refrigerator unit for container 1, the pressure difference generated by the evaporator fan 36 is utilized to ventilate the container C. By moving the opening/closing member 41, the opening degree of the ventilation passage 40 is adjusted and thus the ventilation quantity is adjusted. As shown in FIG. 3(c), the ventilation passage 40 is completely open when the positions of the opening 46 of the opening/closing member 41 and the intake port 44 are aligned.

When the opening/closing member 41 is slid in the opposite direction as just described, the opening cross sectional areas of the intake port 44 and exhaust port 45 decrease in accordance with the amount of movement of the opening/closing member 41. The ventilation passage 40 is fully closed when the opening 46 of the opening/closing member 41 is positioned between the intake port 44 and the exhaust port 45 (see FIG. 3(a)). A graduated scale is provided in near the opening/closing member 41 and the opening/closing member 41 is moved manually using this scale as an indicator of the ventilation quantity.

Opening Degree Detecting Mechanism

Figure 4:
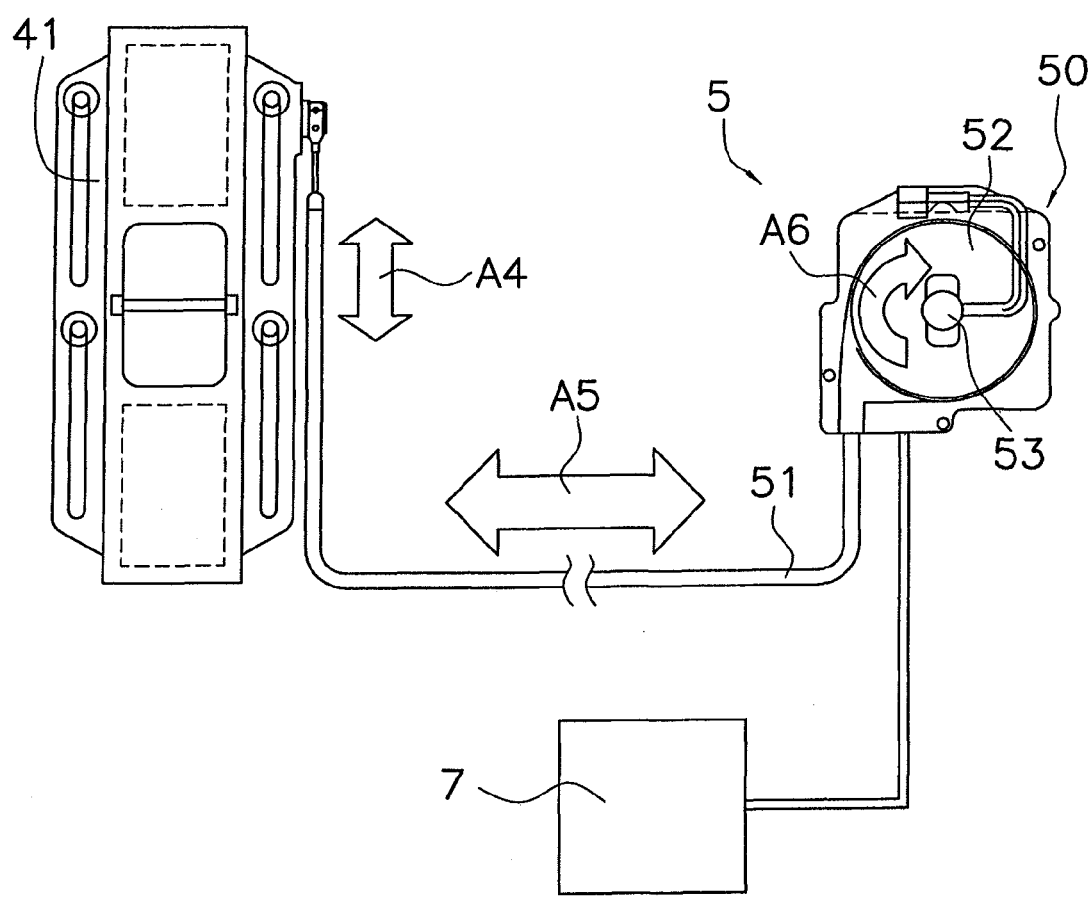
FIG. 4 is a schematic view of the opening degree detecting mechanism 5.

The opening degree detecting mechanism 5 is configured to acquire opening degree data (ventilation data) indicating the opening degree of the ventilation passage 40. The opening degree data indicates the quantity of air ventilated by the ventilating mechanism 4 (hereinafter called "ventilation quantity") indirectly. As shown in FIG. 4, the opening degree detecting mechanism 5 is provided with an opening degree detecting device 50 (opening degree detecting means) and a wire 51 (transmitting means) configured and arranged to transmit the amount of movement of the opening/closing member 41 to the opening degree detecting device 50.

The opening degree detecting device 50 is arranged in the exterior storage space SP1 and serves to detect the opening degree of the ventilation passage 40 based on the movement amount of the opening/closing member 41. The opening degree detecting device 50 has a wire winding drum 52 and a position meter 53. The wire winding drum 52 has a circular shape for winding the wire 51 and is configured to rotate in accordance with the movement of the wire 51 (see unshaded arrow A6). The position meter 53 serves to detect the rotational angle of the wire winding drum 52 and send the detected rotational angle to a controller 7. In short, the position meter 53 can detect the opening degree of the ventilation passage 40 by detecting the movement amount and position of the opening/closing member 41 based on the rotational angle of the wire winding drum 52.

Figure 5:
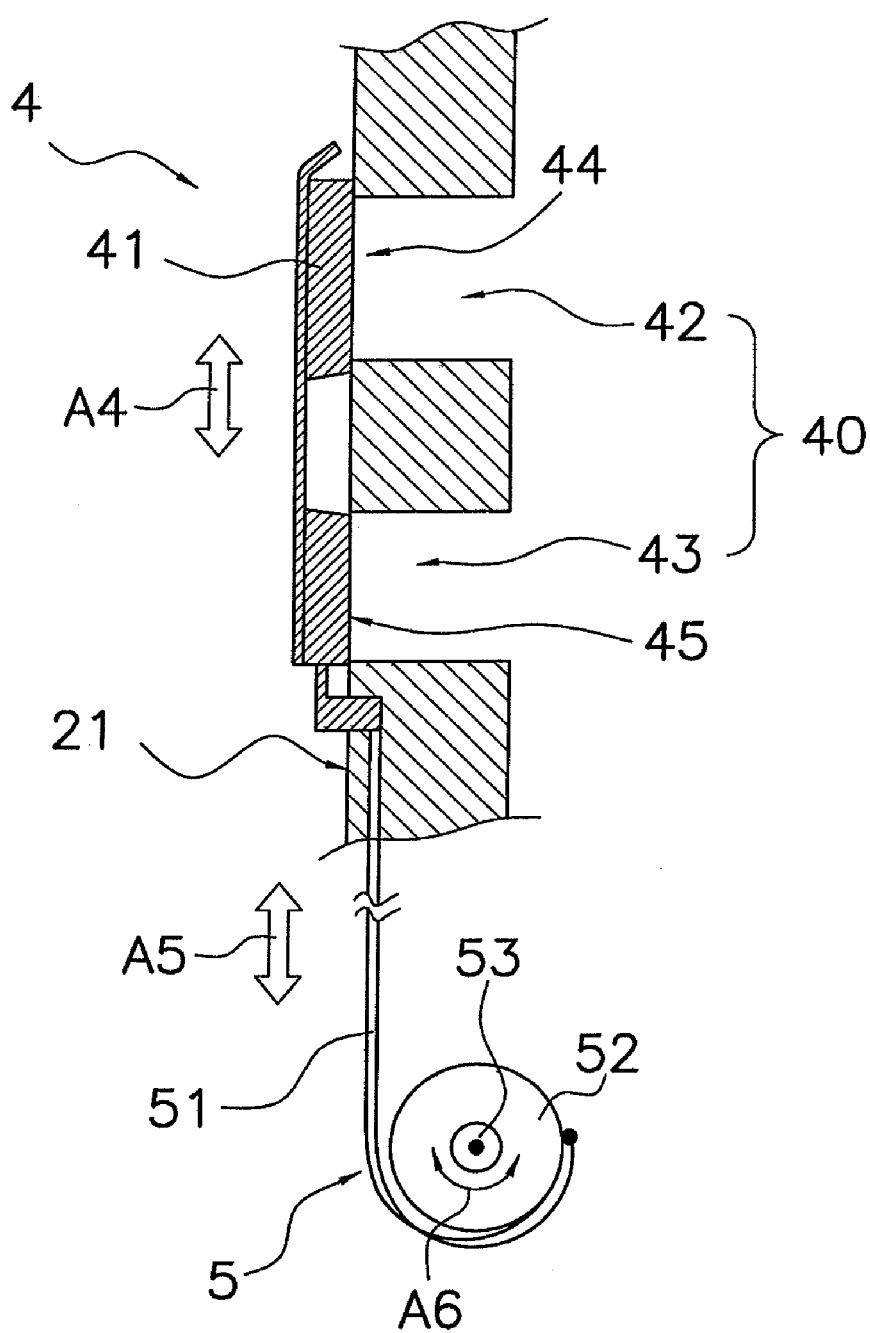
FIG. 5 illustrates how the opening degree detecting mechanism 5 detects the opening degree.
Figure 6:
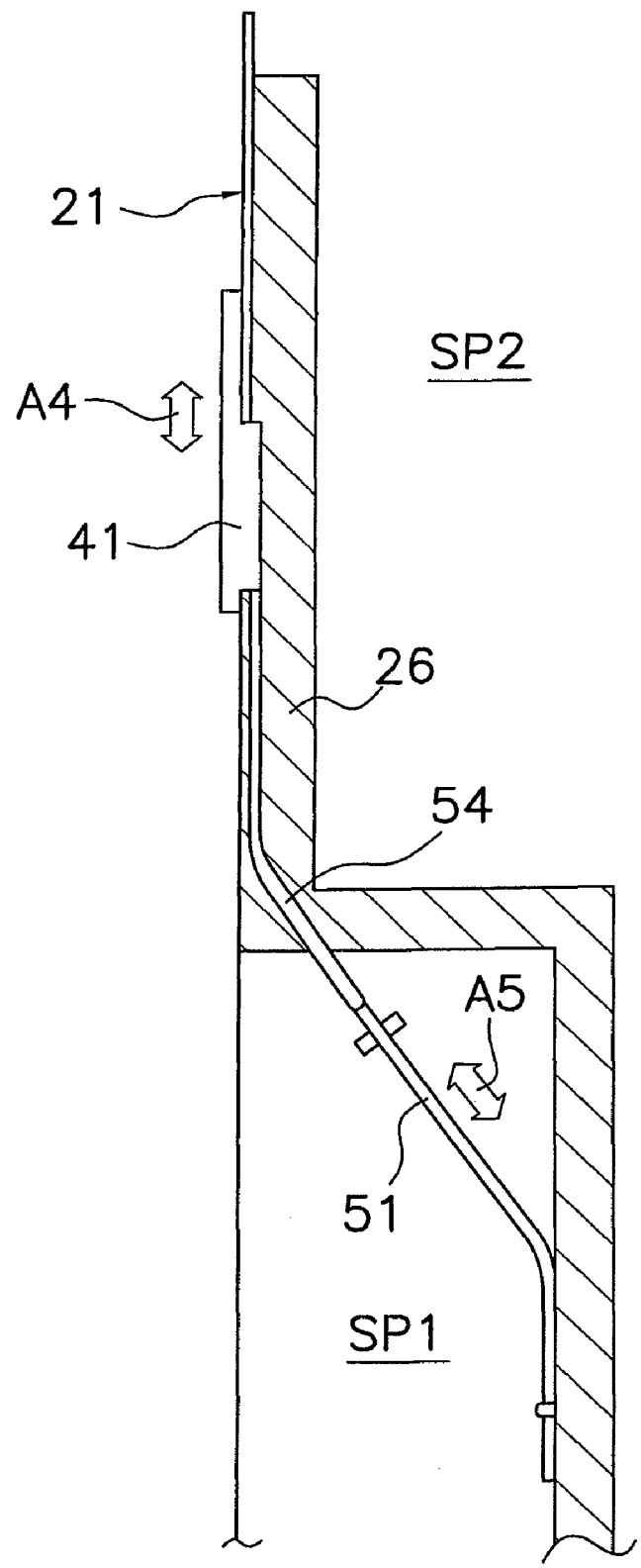
FIG. 6 is a side cross sectional view in the vicinity of the thermally insulated wall 26.

The wire 51 is a metal wire member configured and arranged to transmit the movement amount of the opening/closing member 41 to the opening degree detecting device 50. The wire 51 is arranged to span from the upper portion of the front face 21 where the opening/closing member 41 is provided to the exterior storage space SP1 where the opening degree detecting device 50 is arranged and, as shown in FIG. 5, the wire 51 links the opening/closing member 41 and the wire winding drum 52 together. FIG. 5 illustrates the linkage of the opening/closing member 41 and the wire winding drum 52 in a simplified schematic manner. As shown in FIG. 6, the wire 51 is inserted through a lead-through pipe 54 embedded in the thermally insulated wall 26. The lead-through pipe 54 passes from the upper portion of the front face 21 where the opening/closing member 41 is provided, through the interior of the thermally insulated wall 26, and down into the exterior storage space SP1 and serves to guide the wire 51 from the upper portion of the front face 21 to the external storage space SP1. The wire 51 moves through the lead-through pipe 54 (see unshaded arrow A5) in accordance with the movement of the opening/closing member 41 (see unshaded arrow A4) and thereby transmits the movement of the opening/closing member 41 to the opening degree detecting device 50.

Thus, with this opening degree detecting mechanism 5, the opening/closing member 41 and the opening degree detecting device 50 can be arranged in separated positions because the movement amount of the opening/closing member 41 is transmitted to the opening degree detecting device 50 by the wire 51.

Sensors

Figure 7:
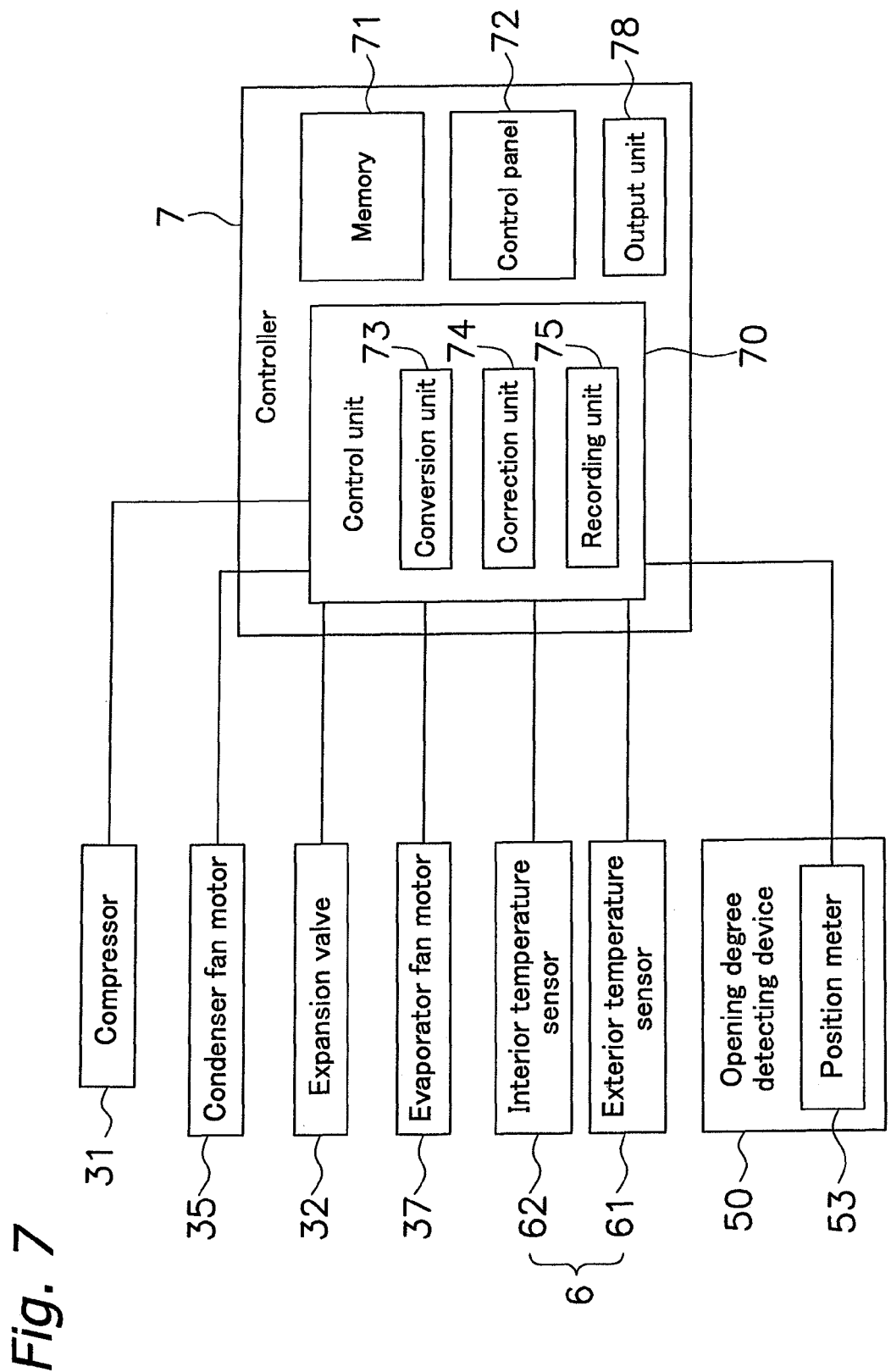
FIG. 7 is a control block diagram.

The sensors 6 include an exterior temperature sensor 61 (temperature detecting means) for detecting the temperature of the exterior OS of the container C and an interior temperature sensor 62 for detecting the temperature of the interior IS of the container C (see FIG. 7). The exterior temperature, interior temperature, and other information detected by the sensors are sent to the controller 7.

Controller

The controller 7 is a device for controlling the refrigerator unit for container 1 and is arranged in the external storage space SP1. As shown in FIG. 7, the controller 7 has a control unit 70 comprising a CPU or the like, a memory 71, a control panel 72 for displaying information and making entries to control, an output unit 78, etc.

The control unit 70 is connected to the compressor 31, the condenser fan motor 35, the expansion valve 32, the evaporator fan motor 37, and the sensors 6 and serves to control the operation of the refrigerator unit for container 1. The control unit 70 is also connected to the position meter 53 of the opening degree detecting device 50 and is configured to log (record) the ventilation quantity in the memory 71 based on the information detected by the opening degree detecting device 50. The control unit 70 has a conversion unit 73, a correction unit 74, and a recording unit 75.

Figure 8:
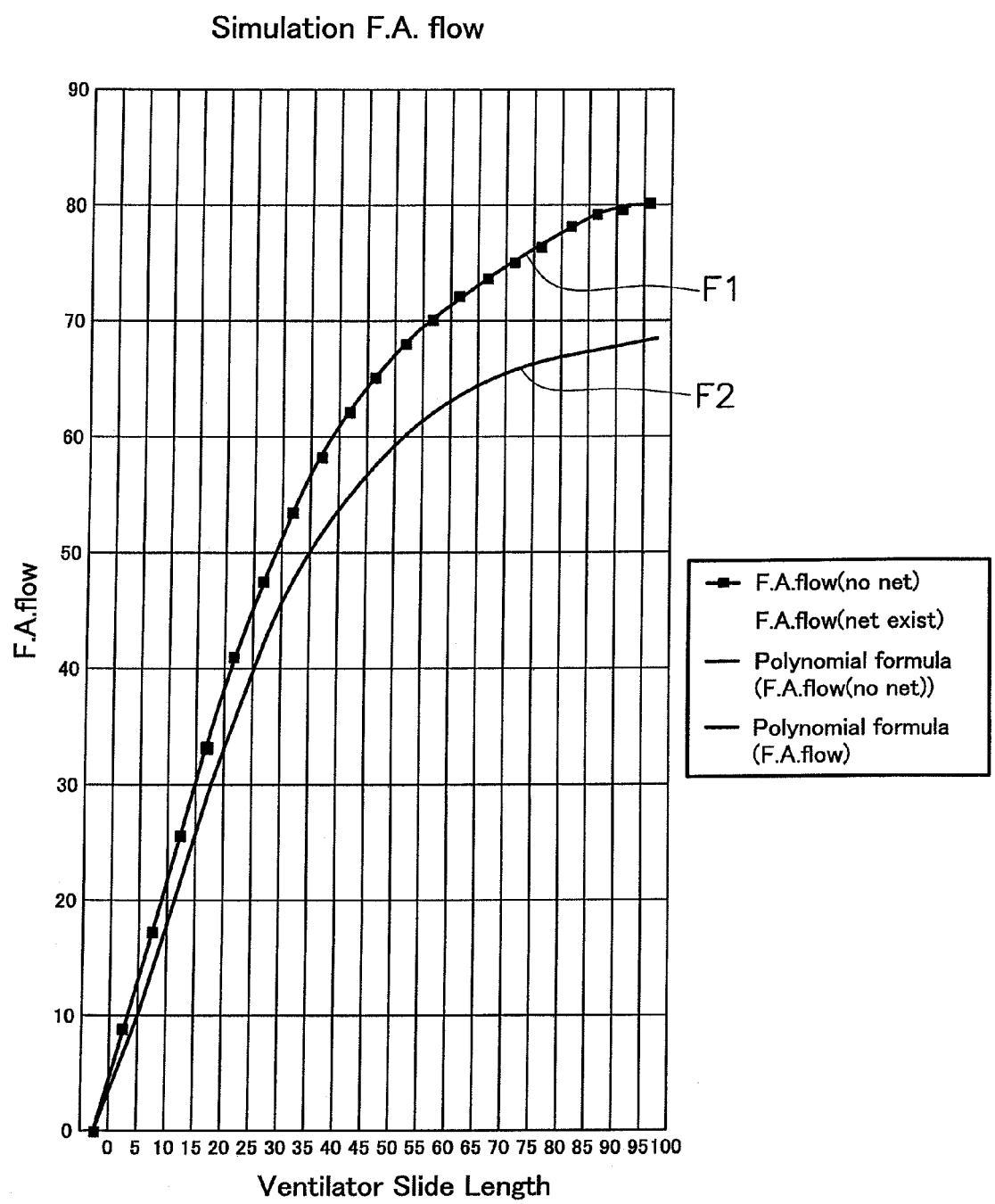
FIG. 8 is a graph plotting the first conversion formula F1 and the second conversion formula F2.

The conversion unit 73 converts the opening degree data, which indicates the ventilation quantity indirectly, into the ventilation quantity. More specifically, the conversion unit 73 is configured to convert the movement amount of the opening/closing member 41 detected by the opening degree detecting device 50 into a quantity of ventilated air. Since the opening cross sectional areas of the intake port 44 and exhaust port 45 are adjusted when the opening/closing member 41 moves, the movement amount of the opening/closing member 41 corresponds to the quantity of ventilated air. Thus, the quantity of ventilated air can be calculated using a conversion formula that indicates the correspondence between the movement amount of the opening/closing member 41 and the quantity of ventilated air. The conversion unit 73 is provided with a first conversion formula F1 (conversion means) and a second conversion formula F2 as shown in FIG. 8 and is configured to use either conversion formula, whichever is selected. The first conversion formula F1 indicates the correspondence between the movement amount of the opening/closing member 41 and the quantity of ventilated air in a case where a protective screen is not mounted to the intake port 44 and exhaust port 45. The second conversion formula F2 indicates the correspondence between the movement amount of the opening/ closing member 41 and the quantity of ventilated air in a case where a protective screen is mounted to the intake port 44 and exhaust port 45 and is different from the first conversion formula F1. The protective screen serves to prevent contaminants from entering the interior IS of the container C from the exterior OS and is mounted to the intake port 44 and exhaust port 45. Since the pressure difference between the first chamber R1 and the exterior OS is different in a case where a protective screen is mounted to the intake port 44 and exhaust port 45 than in a case where a protective screen is not provided, the first conversion formula F1 and the second conversion formula F2 are different. Thus, a more accurate conversion can be accomplished by using the conversion formulas F1, F2 selectively depending on the constituent features of the ventilation mechanism 4.

The correction unit 74 corrects the movement amount of the opening/closing member 41 transmitted by the wire 51 based on the exterior temperature. More specifically, since the wire 51 expands and contracts as the temperature changes, error occurs in the movement amount of the opening/closing member 41 depending on the change in the temperature. The correction unit 74 is configured to compensate for the error that results from changes in the exterior temperature. The correction unit 74 corrects the detected movement amount using, for example, the formula shown below.

$$l_c = l_t \times \{1 + \alpha(t - t_0)\}$$

In the formula, $l_c$ is the corrected movement amount, $l_t$ is the actual measured value of the movement amount, $\alpha$ is the coefficient of linear thermal expansion of the wire 51, t is the exterior temperature at the time when the movement amount is detected, and t0 is the exterior temperature when setting the zero-point.

Since the error resulting from expansion and contraction of the wire 51 is corrected in this way, the ventilation quantity can be calculated more accurately.

Although in this embodiment the correction is performed using the exterior temperature as the ambient temperature of the wire 51, it is also acceptable to detect the temperature near the wire 51 and use the detected temperature for the correction.

Figure 9:
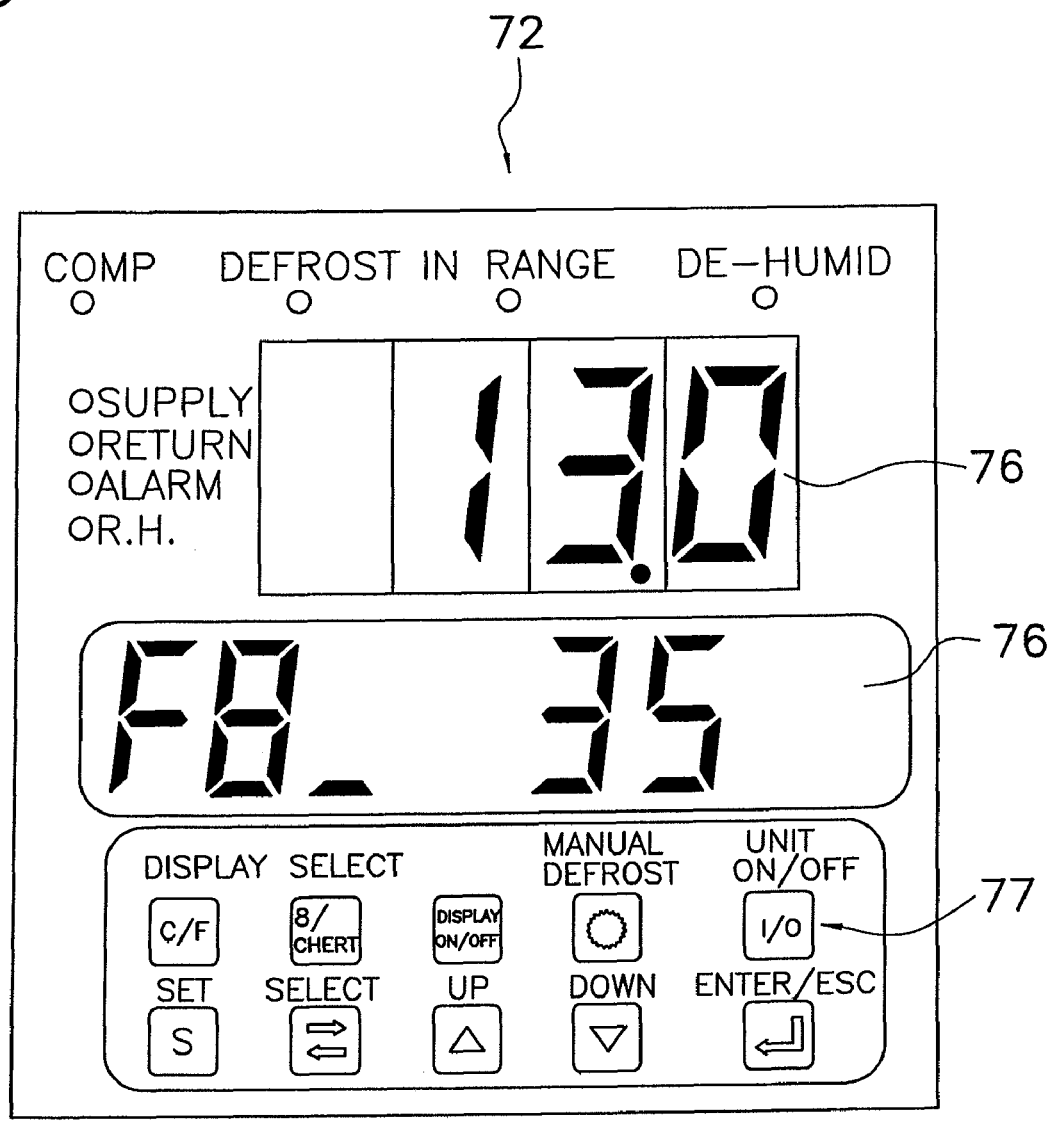
FIG. 9 is a front view of the control panel 72.

In addition to logging the history of the ventilation quantity in the memory 71, the recording unit 75 displays the ventilation quantity on a display panel 76 (first output unit and second output unit) of the control panel 72 (see FIG. 9). The recording unit 75 records the history of the ventilation quantity, which comprises the ventilation quantities obtained by converting the opening degree of the ventilation passage 40 and the dates (year/month/day) and times of day when the ventilation quantities were recorded, in the memory 71. The recording unit 75 logs the ventilation quantity history at the following three timings. The first timing is when the refrigerator unit for container 1 starts running. That is, the recording unit 75 logs the ventilation quantity and other data when the compressor 31, evaporator fan motor 37, and condenser fan motor 35 are driven and the refrigerator unit for container 1 starts cooling the interior IS of the container C. The second timing is each time a specific amount of time elapses or at a specific time of day. For example, the recording unit 75 might log the ventilation quantity and other data once per day at a specific time (e.g., 00:00 AM). The third timing is when the opening degree of the ventilation passage 40 is changed. That is, the recording unit 75 logs the ventilation quantity and other data when the opening/closing member 41 is moved and the opening degree of the ventilation passage 40 is changed. By logging the ventilation quantity and other data at these three timings, the ventilation quantity can be logged in a more detailed fashion. Thus, the ventilation quantity can be known in more detail. Additionally, the value of the ventilation quantity is logged according to a prescribed incremental value. For example, in consideration of the conversion error between the opening degree and the ventilation quantity, the ventilation quantity might be logged in increments of 5 $m^3/h$.

The control panel 72 is arranged in the external storage space SP1 of the front face 21 and faces the exterior OS. As shown in FIG. 9, the control panel 72 is provided with a display panel 76 and input keys 77. The display panel 76 displays such information as the interior temperature of the container C and the ventilation quantity obtained by converting the opening degree data. The input keys 77 are used to turn the refrigerator unit for container 1 on and off and to enter operation details.

The ventilation quantity is not only displayed on the display panel 76 but also outputted by the output unit 78 (first output unit and second output unit). The output unit 78 outputs the logged history of the ventilation quantity. The output unit 78 is, for example, a printer serving to print the ventilation quantities, dates (year/month/day), and times that have been logged, a write device configured to write the ventilation quantities and other data to a recording medium as electronic data, or an output port for transmitting the ventilation quantities and other data to another information terminal through a communication cable or wireless connection as electronic data. An example of the ventilation quantity history list outputted by the output unit 78 is shown in FIG. 10. In this history list, the ventilation quantity D1 is a ventilation quantity logged when the opening degree of the ventilation passage 40 is changed. The ventilation quantity D2 is a ventilation quantity logged at a specific time of day. The ventilation quantity D3 is a ventilation quantity logged when the refrigerator unit for container 1 started operating. The ventilation quantities D1, D2, D3 are outputted together with the temperatures T1 and the date (year/month/day) and time T2 when the ventilation quantities D1, D2, D3, and the interior temperature T were detected. The temperatures T1 are the temperature setting, the interior temperature of the container C detected during transport, etc. The temperatures T1 and the ventilation quantities D1, D2, D3 are detected and recorded at a plurality of times T2 during transport.

Logging and Output of Ventilation Quantities

Figure 11:
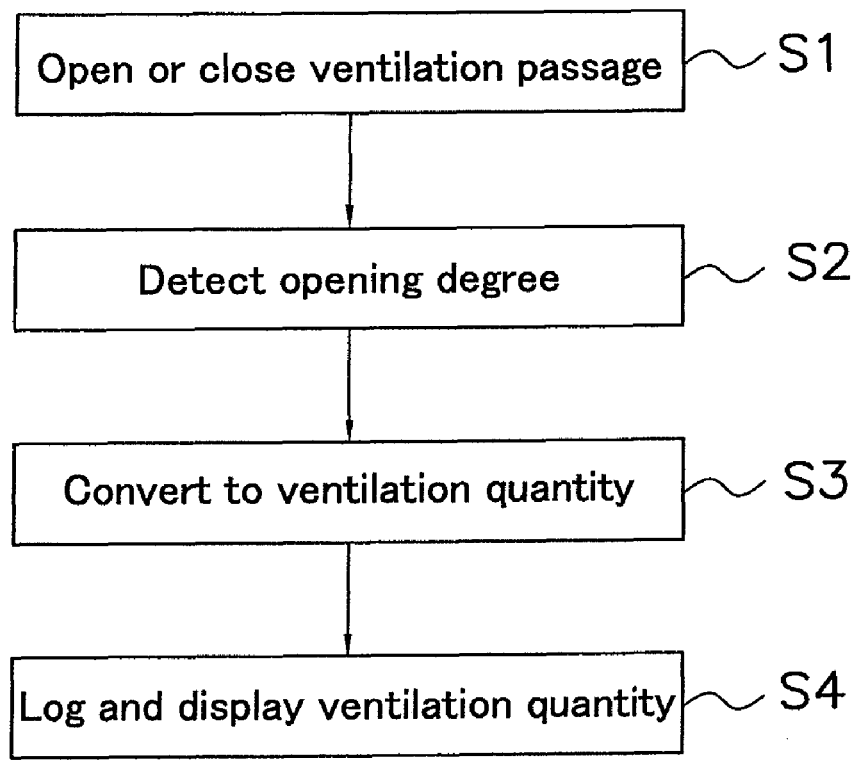
FIG. 11 is a flowchart indicating the procedure for logging and outputting the ventilation quantity.

The procedure for logging the ventilation quantity will now be described based on the flowchart shown in FIG. 11.

In step S1, the ventilation passage 40 is closed or opened. In this embodiment, the opening degree of the ventilation passage 40 is changed manually by sliding the opening/closing member 41. When the opening/closing member 41 is moved, the wire 51 is either pulled or pushed in accordance with the movement of the opening/closing member 41. The movement of the wire 51 is transmitted to the wire winding drum 52 and the wire winding drum 52 rotates.

In step S2, the opening degree is detected. In this embodiment, the position meter 53 detects the rotational angle of the wire winding drum 52. The opening degree of the ventilation passage 40 is outputted from the opening degree detecting device 50. That is, the opening degree of the ventilation passage 40 is outputted in the form of the rotational angle of the wire winding drum 52. The outputted opening degree is sent to the control unit 70 of the controller 7.

In step S3, a conversion calculation is executed to obtain the ventilation quantity. In this embodiment, the opening degree of the opening/closing member 41 is converted to a ventilation quantity using either the first conversion formula F1 or the second conversion formula F2.

In step S4, the ventilation quantity and other data is logged and displayed. In this embodiment, the conversion-calculated ventilation quantity and the date (year/month/day) and time it was logged are recorded in the memory 71 and the ventilation quantity is displayed on the display panel 76. The logging and display of the ventilation quantity and other data are performed at the aforementioned three timings. The output unit 78 outputs the history of the ventilation quantity and other data.

Characteristic Features (1) With this refrigerator unit for container 1, the interior IS of the container C is ventilated and the ventilation quantity is logged. As a result, the fact that the opening/closing member 41 was moved and ventilation was conducted during transport of a container C can be confirmed afterwards by checking the ventilation quantity history.

In particular, it is difficult to check the history of the opening degree of the opening/closing member 41 and the ventilation quantity when the opening/closing member 41 is moved a plurality of times. However, with this refrigerator unit for container 1, the history of the ventilation quantity can be known easily by outputting the logged ventilation quantities.

For example, in the case of a container C used to transport fruit, it is necessary to exhaust the ethylene gas generated by the fruit and draw in fresh outside air. Therefore, it is important to manage the ventilation quantity in order to maintain the freshness of the fruit. With this refrigerator unit for container 1, by logging the ventilation quantity, a transport company transporting the container C can provide the fruit owner with a guarantee that a certain amount of ventilation is conducted.

(2) With this refrigerator unit for container 1, the opening degree of the ventilation passage 40 is detected based on the amount of movement of the opening/closing member 41 and the ventilation quantity is calculated based on the opening degree. As a result, ventilation quantity can be obtained with a system having a simple configuration.

Figure 12:
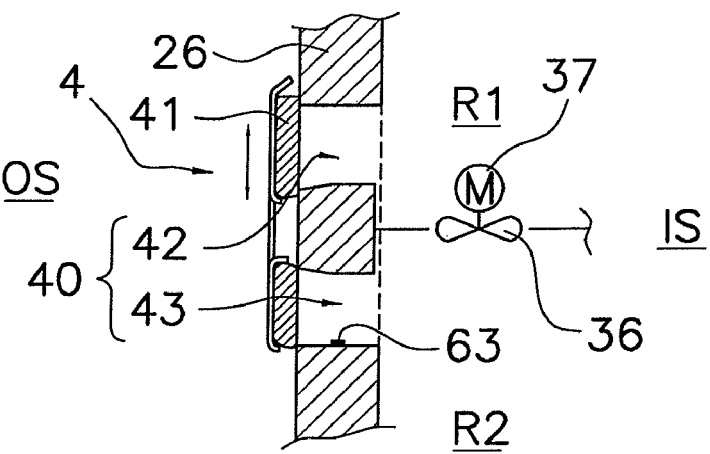
FIG. 12(a) is a schematic view illustrating a case in which air speed data is detected.
FIG. 12(b) is a schematic view illustrating a case in which output data is detected.
FIG. 12(c) is a schematic view illustrating a case in which pressure difference data is detected.
Figure 12:
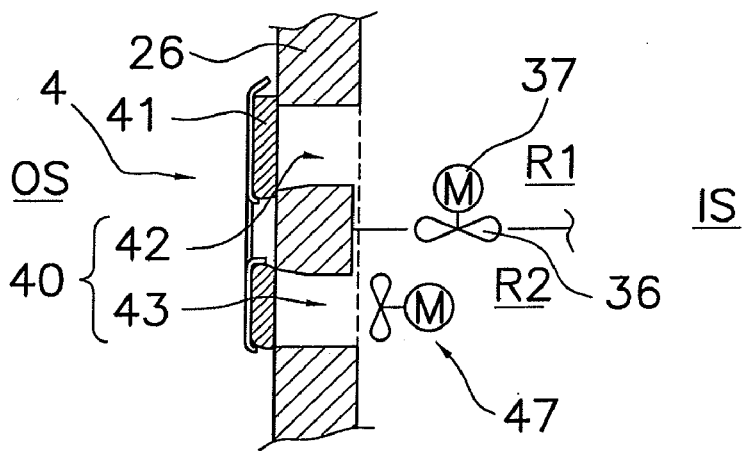
Figure 12:
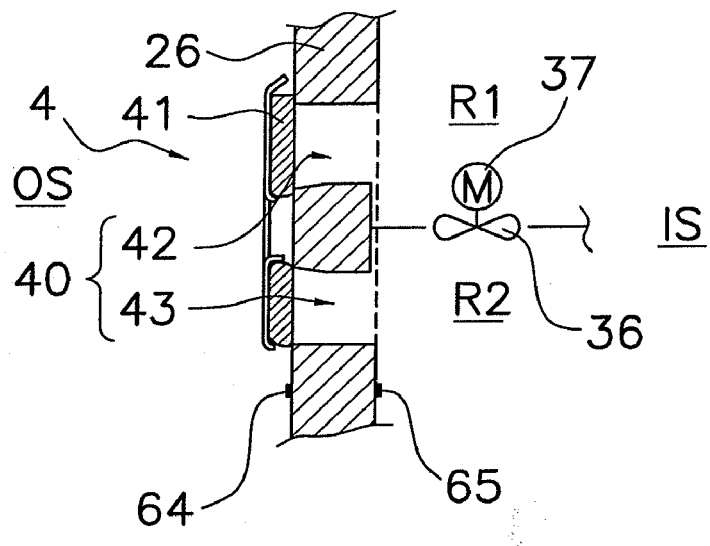

OTHER EMBODIMENTS (1) In the embodiment described above, the ventilation quantity is found using the movement amount of the opening/closing member 41 and a conversion formula. It is also acceptable to find the ventilation quantity based on the speed of the ventilated air and the opening cross sectional area. For example, as shown in FIG. 12(a), an air speed sensor 63 (air speed detecting means) can be provided in the ventilation passage 40. In such a refrigerator unit for container as this, an air speed sensor 63 that detects the speed of the air passing through the exhaust passage 43 is provided in the exhaust passage 43. The control unit 70 logs data (ventilation data) that includes the air speed data detected by the air speed sensor 63 and the opening cross sectional area. The control unit 70 converts the air speed data into a ventilation quantity by finding the product of the detected air speed and the opening cross sectional area of the exhaust port 45 and logs the resulting ventilation quantity. In view of improving the detection accuracy, it is preferred that the air speed sensor 63 be mounted on the side where the opening/closing member 41 begins to open.

(2) Although in the embodiment described above, the ventilation quantity is found using the movement amount of the opening/closing member 41 and a conversion formula, when the refrigerator unit for container 1 is provided with a blower device 47 for ventilation as shown in FIG. 12(b), it is also acceptable to detect the output of the blower device 47 and log the detected output data (ventilation data). It is also acceptable to convert the output data into a ventilation quantity and log the ventilation quantity. The blower device 47 conducts ventilation by creating a flow of air that flows from the second chamber R2 to the exterior OS and a flow of air that flows from the exterior OS to the first chamber R1. Since the ventilation quantity is affected by the output of the blower device 47, the controller 70 can find the ventilation quantity based on the output of the blower device.

(3) In the embodiment described above, the ventilation quantity is found using the movement amount of the opening/closing member 41 and a conversion formula. It is also acceptable to find the ventilation quantity by detecting the pressure difference between the exterior OS and the interior IS. For example, as shown in FIG. 12(c), there may be a refrigerator unit for container 1 provided with an exterior pressure sensor 64 (pressure detecting means) that detects the pressure of the exterior OS and an interior pressure sensor 65 (pressure detecting means) that detects the pressure of the first chamber R1 or the second chamber R2. In such a refrigerator unit for container 1 as this, pressure difference data (ventilation data) indicating the difference between the exterior pressure detected by the exterior pressure sensor 64 and the interior pressure detected by the interior pressure sensor 65 are logged. The output data can then be converted into a ventilation quantity and logged.

The ventilation of the air in the interior IS of the container C takes place due to the pressure difference between the exterior OS and the interior IS. In other words, the existence of a pressure difference between the exterior OS and the interior IS causes a flow of air that flows from the exterior OS to the interior IS or a flow of air that flows from the interior IS to the exterior OS to be generated. As a result, ventilation occurs. Thus, the ventilation quantity can be found by detecting the pressure difference between the exterior OS and the interior IS.

It is also acceptable to log freight quantity data related to the quantity of freight in the interior IS of the container C and find the ventilation quantity using the freight quantity data. The quantity of freight in the interior IS of the container C affects the pressure difference between the exterior OS and the interior IS. In other words, the pressure inside the container C is different when the quantity of freight in the interior IS of the container C is large than when the quantity of freight is small. Thus, the ventilation quantity can be found by taking the freight quantity data into consideration.

Figure 13:
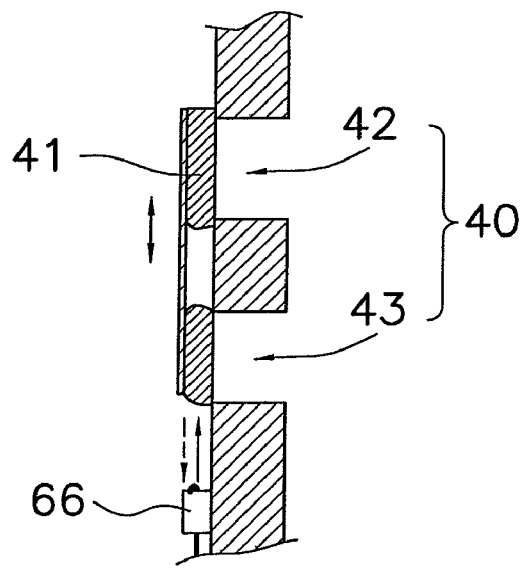
FIG. 13(a) is a schematic view illustrating a case in which the opening degree of the ventilation passage 40 is detected using a photoelectric sensor 66.
FIG. 13(b) is a schematic view illustrating a case in which the opening degree of the ventilation passage 40 is detected using a reed switch 67.
FIG. 13(c) is a schematic view illustrating a case in which the movement of the opening/closing member 41 is transmitted by means of a gear.
Figure 13:
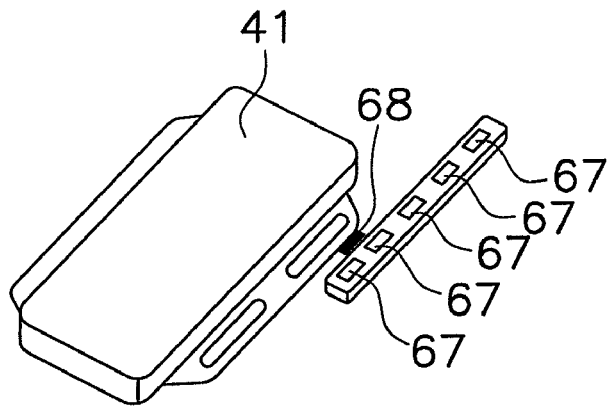
Figure 13:
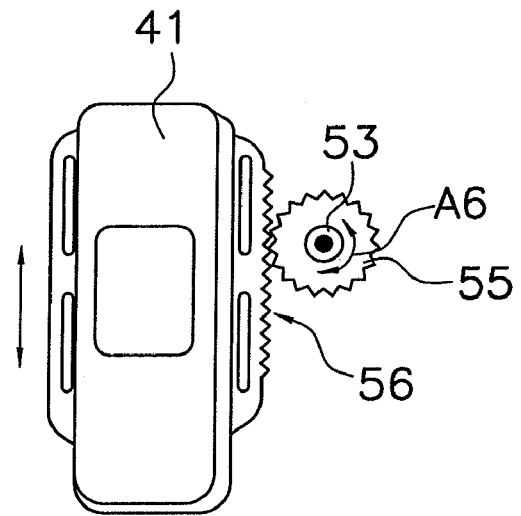

(4) Although in the embodiment described above, the opening degree of the ventilation passage 40 is detected by using a wire 51 to transmit the movement of the opening/closing member 41 to an opening degree detecting device 50, it is also acceptable to detect the opening degree of the ventilation passage 40 with a photoelectric sensor 66 (opening degree detecting means) as shown in FIG. 13(a). The photoelectric sensor 66 is arranged to face the opening/closing member 41 in the direction in which the opening/closing member 41 moves so that it can detect the distance between itself and the opening/closing member 41. With this arrangement, the movement amount of the opening/closing member 41 and thus the opening degree of the ventilation passage 40 imposed by the opening/closing member 41 can be detected. It is also acceptable to detect the amount of movement of the opening/closing member 41 using radio waves instead of light.

(5) Although in the embodiment described above, the opening degree of the ventilation passage 40 is detected by using a wire 51 to transmit the movement of the opening/ closing member 41 to an opening degree detecting device 50, it is also acceptable to detect the opening degree of the ventilation passage 40 with a plurality of reed switches 67 (opening degree detecting means) as shown in FIG. 13(b). The reed switches 67 are arranged parallel to the slide direction of the opening/closing member 41 and are configured to enter an on state when exposed to a magnetic force. A magnet 68 is provided on the opening/closing member 41 and the magnet 68 moves over the reed switches 67 when the opening/closing member 41 moves. Thus, the movement amount and position of the opening/closing member 41 can be detected based on the on/off status of the reed switches 67.

It is also acceptable to detect the opening degree of the ventilation passage 40 using a plurality of limit switches. In such a case, the limit switches are arranged parallel to the slide direction of the opening/closing member 41 and are configured to enter an on state when subjected to mechanical contact. A lever configured and arranged to contact the limit switches is provided on the opening/closing member 41 so that when the opening/closing member 41 moves, the limit switches in positions through which the opening/closing member 41 has passed are turned on. Thus, the movement amount of the opening/closing member 41 can be detected based on the on/off status of the limit switches.

(6) Although in the embodiment described above, the movement of the opening/closing member 41 is transmitted to the opening detecting device 50 by means of a wire 51, it is also acceptable to transmit the movement of the opening/closing member 41 to the opening degree detecting device 50 with a gear 55 (transmitting means) as shown in FIG. 13(c). The gear 55 has a circular shape and is arranged to the side of the opening/closing member 41. A linear gear 56 is provided on a side edge of the opening/closing member 41 and the linear gear 56 of the opening/closing member 41 meshes with the gear 55. A position meter 53 is mounted to the rotational center of the gear 55 and serves to detect the rotational angle of the gear 55. Thus, when the opening/closing member 41 moves up and down, the gear 55 rotates (see solid arrow A6) and the position meter 53 detects the movement amount of the opening/closing member 41 in the form of the rotational angle of the gear 55. As a result, the opening degree of the ventilation passage 40 can be detected.

Figure 14:
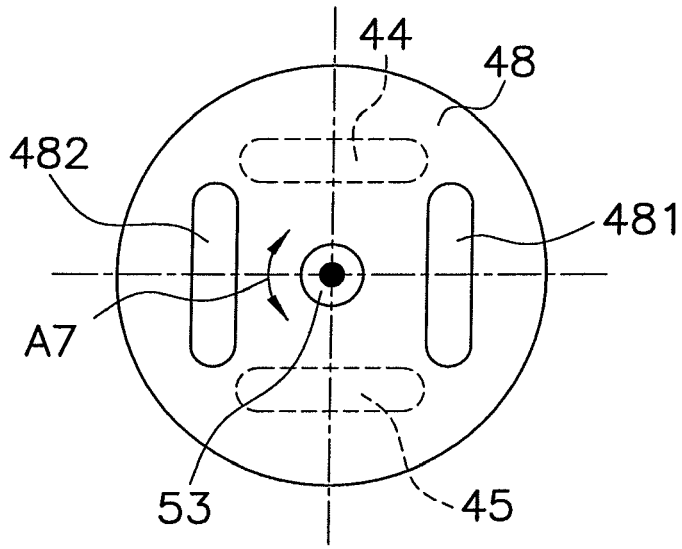
FIG. 14(a) shows an opening/closing member 41 configured to open and close the ventilation passage 40 by rotating.
FIG. 14(b) is a schematic view illustrating a case in which the movement of the opening/closing member 41 is transmitted by means of a wire 51.
FIG. 14(c) is a schematic view illustrating a case in which the movement of the opening/closing member 41 is transmitted by means of a gear.
Figure 14:
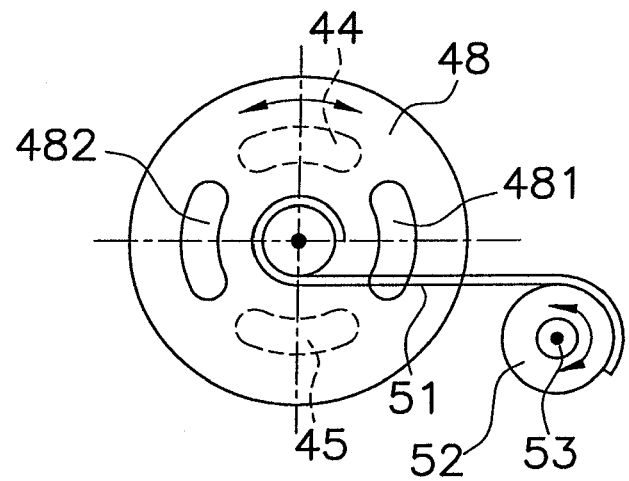
Figure 14:
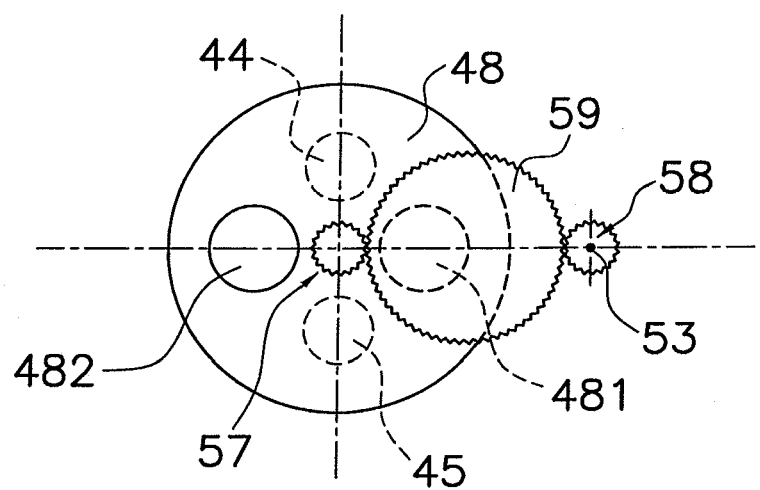

(7) Although in the embodiment described above, the ventilation passage 40 is opened and closed by sliding the opening/closing member 41 linearly up and down, it is also acceptable to open and close the ventilation passage 40 by rotating an opening/closing member 48 as shown in FIG. 14(a). The opening/closing member 48 has a circular shape and is mounted to the upper portion of the front face 21 such that its center is positioned between the intake port 44 and the exhaust port 45. Two openings 481, 482 corresponding to the intake port 44 and the exhaust port 45 are provided in the opening/closing member 48. When the opening/closing member 48 rotates (see the solid arrow A7), the two openings 481, 482 overlap the intake port 44 and exhaust port 45 and thereby open the intake port 44 and exhaust port 45. When the portions of the opening/closing member 48 other than the openings 481, 482 overlap the intake port 44 and exhaust port 45, the intake port 44 and exhaust port 45 are closed. In FIG. 14(a), the two openings 481, 482 are positioned such that the ports are completely closed. When an opening/closing member 48 like that shown in FIG. 14(a) is rotated 90 degrees from a position where the portions of the opening/closing member 48 other than the openings 481, 482 are aligned with the intake port 44 and exhaust port 45, the ventilation passage 40 is completely closed. When the opening/closing member 48 is rotated 90 degrees further or 90 degrees in the opposite direction to a position where the two openings 481, 482 are aligned with the intake port 44 and exhaust port 45, the ventilation passage 40 is completely open. A position meter 53 is mounted to the center of the gear 48 and serves to detect the rotational angle of the opening/closing member 48 as the movement amount of the opening/closing member 48, i.e., as the opening degree of the ventilation passage 40.

It is also acceptable to provide the position meter 53 in a position separated from the position meter 53 instead of at the center of the opening/closing member 48. For example, as shown in FIG. 14(b), an opening degree detecting device 50 comprising a wire winding drum 52 and a position meter 53 arranged at the center of the wire winding drum 52 can be arranged in a position separated from the opening/closing member 48 and a wire 51 can be used to transmit the rotation of the opening/closing member 48 to the wire winding drum 52. It is also acceptable to provide a circular gear 57, 58 (transmitting means) at the center of each of the opening/closing member 48 and the position meter 53 and to provide another circular gear 59 (transmitting means) that is positioned between and meshes with the gears 57, 58, as shown in FIG. 14(c). With this arrangement, too, the rotation of the opening/closing member 48 is transmitted to the position meter 53 by the gears 55, 57, 58, 59 and the opening degree of the ventilation passage 40 can be detected. When a wire winding drum 52 or gears 57, 58, 59 are used as described above, the resolution with which the movement amount of the opening/closing member 48 is detected can be changed easily by changing the diameter of the wire winding drum 52 or the gear ratio of the gears 57, 58, 59.

Figure 15:
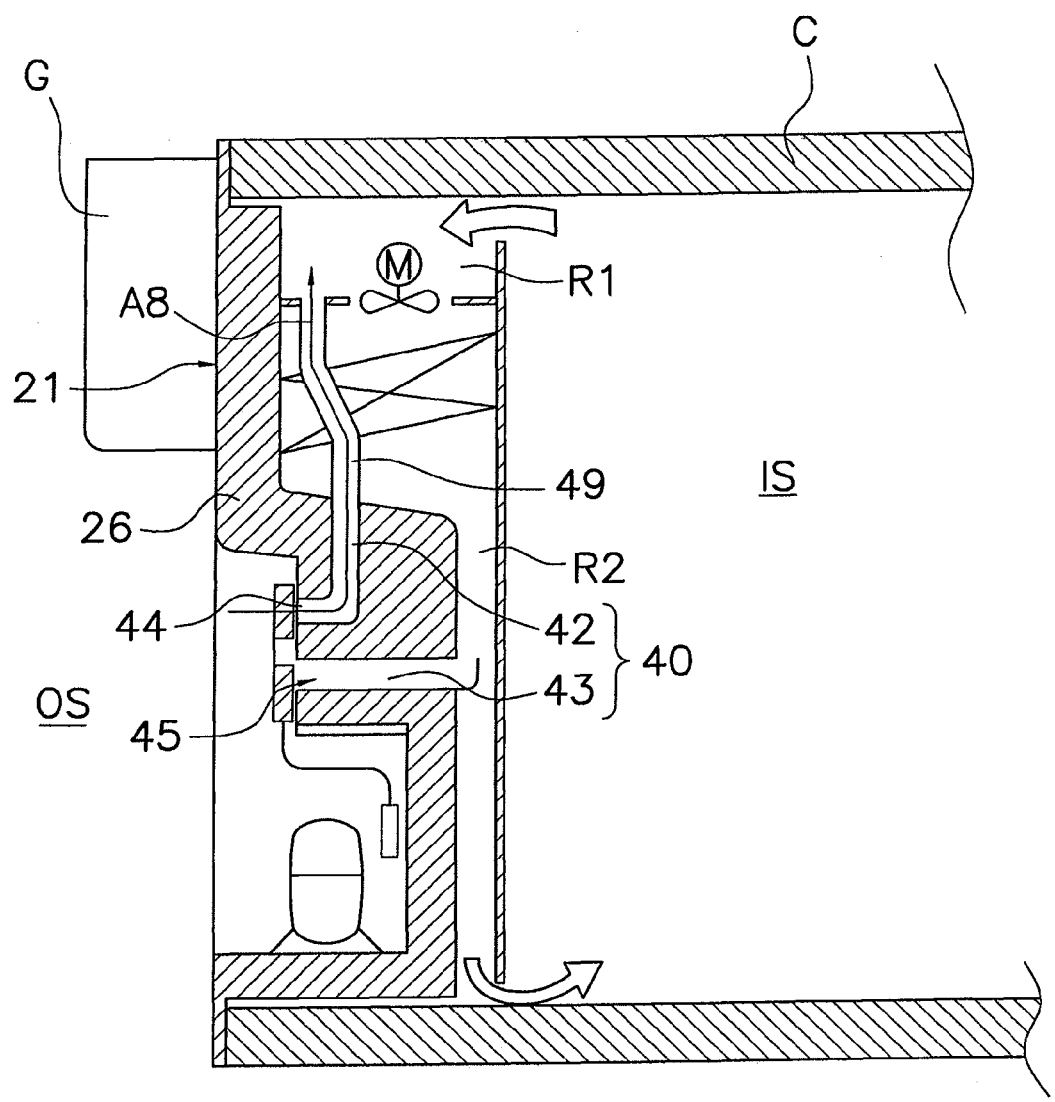
FIG. 15 is a schematic view illustrating a case in which the ventilation passage 40 is provided in a position that is separated from the first chamber R1 or the second chamber R2.

(8) In the embodiment described above, the intake port 44 and the exhaust port 45 are provided closely adjacent to the first chamber R1 and the second chamber R2, respectively. However, due to various circumstances, there are cases in which the intake port 44 and the exhaust port 45 are provided in positions separated from the first chamber R1 or second chamber R2. In such cases, a duct joining the intake port 44 and first chamber R1 and a duct joining the exhaust port 45 and second chamber R2 can be provided. For example, consider a case in which the exhaust port 45 and intake port 44 are provided in the lower portion of the front face 21 such that the intake port 44 is separated from the first chamber R1, as shown in FIG. 15. In such a case as this, it is acceptable to provide a duct 49 that runs from the first chamber R1, passes through the second chamber R2, penetrates the thermally insulated wall 26 and the front face 21, and connects to the intake port 44. In this way, even though the intake port 44 is in a position separated from the first chamber R1, air drawn into the intake port 44 from the exterior OS can be delivered to the first chamber R1 by the duct 49 (see solid arrow A6).

In the case of marine freight containers C, there are times when the refrigerator unit for container runs at terminals and the like in order to keep the freight cool after disembarkation. In such cases, a generator G is often installed on the upper portion of the front face 21 as shown in FIG. 15 because a power supply is not available. Consequently, the intake port 44 and exhaust port 45 cannot be provided in the upper portion of the front face 21 and must be provided in the lower portion of the front face 21. Therefore, particularly in cases where ventilation is accomplished by utilizing pressure differences, it is effective to provide a duct(s) 49 as just described in order to ventilate the container.

(9) Although in the embodiment described above, ventilation quantities calculated based on the opening degree data are outputted to the display panel 76 of the control panel 72 and the output unit 78, it is also acceptable to output such ventilation data as opening degree data.

(10) Although in the embodiments described above, such data as opening degree data, air speed data, output data, pressure difference data, and freight quantity data that indicate the ventilation quantity indirectly are detected and logged, it is also acceptable to provide a ventilation quantity sensor that detects the ventilation quantity directly and log the detected ventilation quantity.

(11) Although in the embodiments described above, the ventilation quantity is logged in a controller 7 arranged in the exterior storage space SP1, it is also acceptable to log the ventilation quantity in an external computer terminal, such as a desktop computer or notebook computer.

By using a refrigerator unit for container in accordance with the present invention, the quantity of air ventilated in the interior of a container can be known because recorded ventilation data related to the quantity of ventilated air can be reviewed afterwards.

What is claimed is:

1. A refrigerator unit for a container, comprising:
   a ventilation unit configured to ventilate air from an interior of a container, the ventilation unit having a ventilation passage through which the ventilated air passes and an opening/closing member configured to open and close the ventilation passage;
   an acquisition unit configured to acquire ventilation data related to a quantity of air ventilated by the ventilation unit and configured to acquire opening degree data indicating the degree to which the opening/closing member has opened the ventilation passage as at least part of the ventilation data, the acquisition unit having
   an opening degree detecting device configured to detect the opening degree based on a movement amount of the opening/closing member, and
   a transmitting device configured to transmit the movement amount of the opening/closing member to the opening degree detecting device;
   a recording unit configured to record the ventilation data acquired by the acquisition unit;
   a temperature detecting device configured to detect an ambient temperature surrounding the transmitting device; and
   a correction unit configured to correct the movement amount of the opening/closing member transmitted by the transmitting device based on the ambient temperature.

2. The refrigerator unit in accordance with claim 1, wherein the opening/closing member is configured to be manually operated to open and close the ventilation passage.

3. The refrigerator unit in accordance with claim 1, further comprising
   a thermally insulated wall made of a thermal insulation material that is arranged and configured to separate the interior of the container an exterior of the container; and
   the transmitting device being imbedded in the thermally insulated wall.

4. The refrigerator unit in accordance with claim 1, wherein the recording unit is configured to record the ventilation data when the opening degree of the opening/closing member has changed.

* * * * *

UNITED STATES PATENT AND TRADEMARK OFFICE
CERTIFICATE OF CORRECTION

PATENT NO. : 7,784,294 B2  Page 1 of 1
APPLICATION NO. : 12/274826
DATED : August 31, 2010
INVENTOR(S) : Takashi Tanaka It is certified that error appears in the above-identified patent and that said Letters Patent is hereby corrected as shown below:

On the Title Page

Item "[30]  Foreign Application Priority Data

Apr. 28, 2004 (JP).................. 2003-123493"

to

Item -- [30]  Foreign Application Priority Data

Apr. 28, 2003 (JP).................. 2003-123493 --

Signed and Sealed this

Second Day of November, 2010

David J. Kappos
*Director of the United States Patent and Trademark Office*